Aug. 28, 1956    C. L. COOK    2,760,284
MOUNTING ARRANGEMENT FOR TRACTOR CARRIED REVERSIBLE SCOOP
Filed Oct. 3, 1952    2 Sheets-Sheet 1
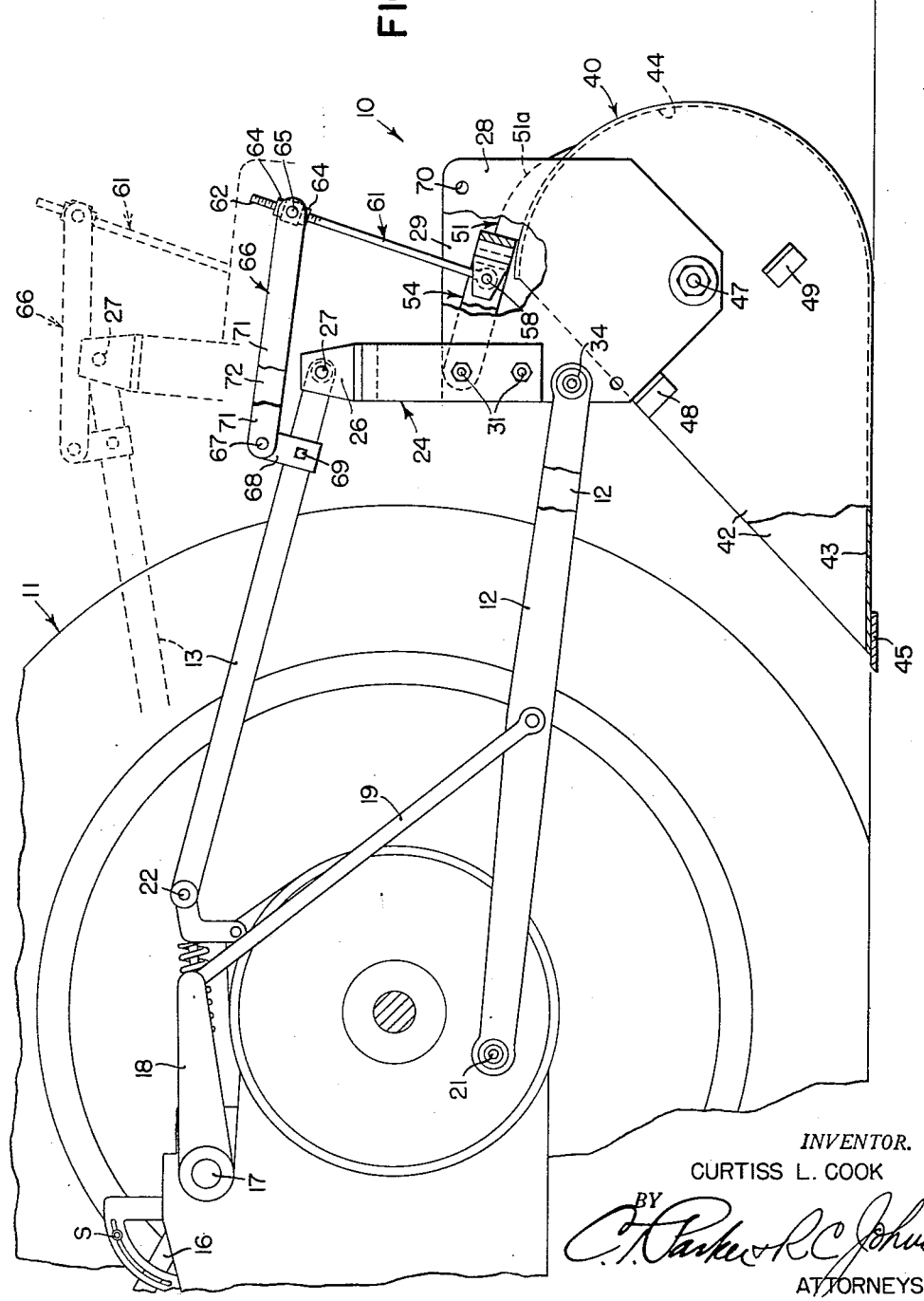
*INVENTOR.*
CURTISS L. COOK
BY
*ATTORNEYS*

Aug. 28, 1956  C. L. COOK  2,760,284
MOUNTING ARRANGEMENT FOR TRACTOR CARRIED REVERSIBLE SCOOP
Filed Oct. 3, 1952  2 Sheets-Sheet 2
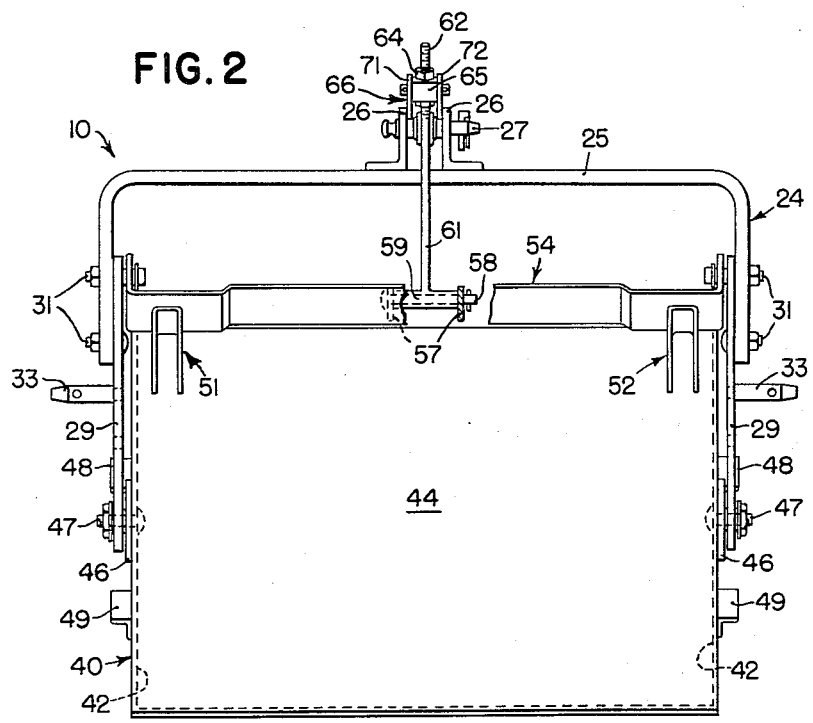
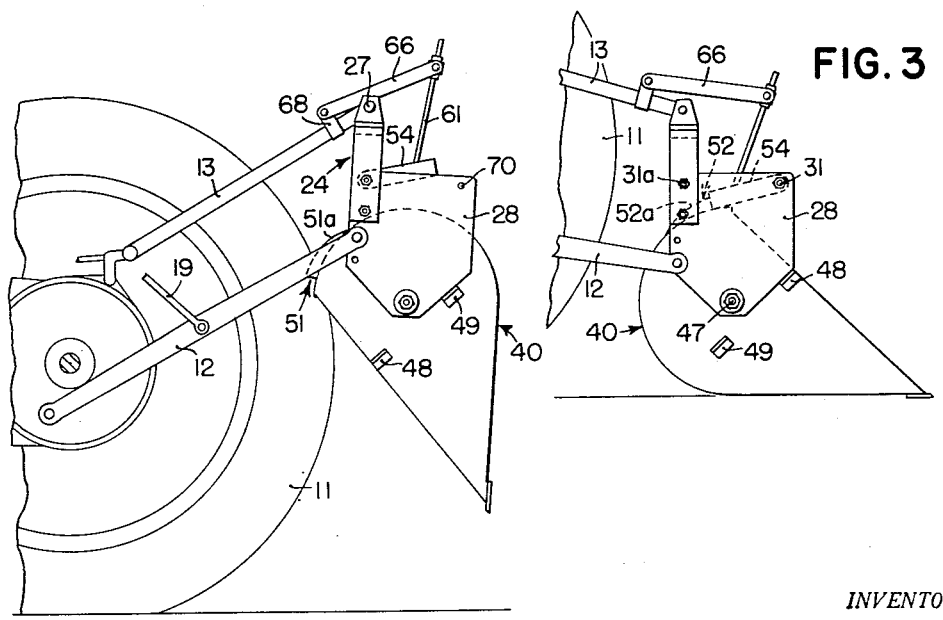
INVENTOR.
CURTISS L. COOK
ATTORNEYS

United States Patent Office 2,760,284
Patented Aug. 28, 1956

2,760,284

MOUNTING ARRANGEMENT FOR TRACTOR CARRIED REVERSIBLE SCOOP

Curtiss L. Cook, Syracuse, N. Y., assignor, by mesne assignments, to Deere & Company, Moline, Ill., a corporation of Illinois Application October 3, 1952, Serial No. 312,909

7 Claims. (Cl. 37—124)

The present invention relates generally to agricultural implements and more particularly to tractor-mounted scoops and more particularly to scoops or other earth-working means adapted to be attached to the upper and lower draft links of a tractor having three-point connection hitch links.

The object and general nature of the present invention is the provision of a tractor-mounted scoop having means for automatically dumping the scoop by actuation of the tractor power lift mechanism to raise the scoop slightly beyond its normal transport position. Another feature of the present invention is the provision of a scoop of this general type that can be mounted in either of two positions, whereby the scoop may be adapted to load by either a forward travel of the tractor or by a backward travel of the tractor. Still further, it is a feature of this invention to provide a reversible scoop in which, in either position of the scoop bucket, the latter lies closely adjacent the rear of the tractor and thereby eliminates the disadvantages of having earth-working means carried a substantial distance rearwardly of the rear wheels of the tractor.

Another important feature of the present invention is the provision of means controlled by the angularity of the draft and hitch links, relatively to the scoop or attachment frame, for automatically dumping the scoop, and still further, it is a feature of this invention to provide automatic dumping mechanism adapted to control the scoop irrespective of whether the scoop bucket is disposed for forward loading or for rearward loading.

These and other objects and advantages of the present invention will be apparent to those skilled in the art after a consideration of a detailed description of the preferred structure, taken in conjunction with the accompanying drawings in which:

Figure 1 is a side view of an earth-working tractor-mounted scoop, showing the same in operating position and connected with the tractor to be controlled by operation of the power lift thereof.

Figure 2 is a rear view of the scoop attachment shown in Figure 1, the tractor being omitted.

Figure 3 is a fragmentary side view showing the scoop bucket mounted in a reversed or rearwardly facing position and showing how the detent means of the present invention controls the scoop bucket irrespective of whether it is mounted in a forwardly facing position or a rearwardly facing position.

Figure 4 is a fragmentary side view showing the position of the scoop bucket when it is used for leveling or spreading.

Referring first to Figure 1, the scoop of the present invention is indicated in its entirety by the reference numeral 10 and is shown as connected to a tractor 11 of the type having a pair of lower draft or tension links 12 and an upper thrust or compression link 13 by which various implements may be attached to the tractor 11 as desired. The tractor 11 is also provided with a power lift unit which, under the control of a valve lever 16, acts through a transverse rockshaft 17 and a pair of lift arms 18 (only one of which is shown) to raise and lower the hitch linkage 12, 13, the power lift arms 18 being connected with the lower links 12 through lift links 19 (only one of which is shown). The lower draft or tension links 12 are connected for lateral and vertical swinging relative to the tractor through ball-type connections 21, and the forward end of the thrust link 13 is connected with the tractor through a similar ball-type connector 22.

The tractor-mounted scoop 10 comprises an upright attachment frame 24 which is made up of a generally U-shaped member 25, the upper intermediate portion of which carries a pair of angle brackets 26 that are apertured to receive the pin 27 that connects the rear end of the upper thrust link 13 with the upper portion of the attachment frame 24. The attachment frame 24 also includes a pair of vertical laterally spaced apart bracket plates 29 that are bolted, as at 31, to the side sections of the attachment frame member 25. The bracket plates 29 extend below the frame member 25 and adjacent the forward end of each there is an outwardly extending trunnion 33 shaped and adapted to receive a ball connector 34 that is carried at the rear end of the associated draft link 12.

The scoop bucket that is supported by the frame 24 is indicated in its entirety by the reference numeral 40 and comprises a member having sides 42 of generally triangular shape and a curved sheet forming a bottom 43 and a rear wall 44. The cutting edge of the bucket is formed by a crossbar 45. The side sheets 42 are suitably reenforced, as at 46, Figure 2, and carry pivot bolts 47 that are rockably received in suitable bushings or the like carried by the lower portions of the attachment frame brackets 28 and 29. Stops 48 and 49 are provided on the side sheets 42 and cooperate with the brackets 28 and 29 to limit the swinging of the bucket 40 relative to the supporting frame structure 24 therefor. For example, as will be clear from Figure 1, the stops 48 cooperate with the brackets 28 and 29 to limit the clockwise rotation of the bucket relative to the attachment frame 24, and when the tractor power lift is operated to raise the bucket into a leveling or spreading position, Figure 4, the stops 49 hold the bucket in a position for spreading soil and the like, as desired.

The upper portion of the bucket 40 carries a pair of stops 51 and 52, each preferably comprising a U-shaped part secured, as by welding, to the upper side of the bucket adjacent the ends thereof, as will be clear from Figure 2. A detent 54 cooperates with the bucket stops 51 and 52 for holding the bucket 40 in its earth-digging position, as shown in Figure 1. The detent 54 comprises a generally U-shaped bail member pivotally connected at its ends to the upper bolts 31. Secured to the central section of the detent bail 54 is a pair of apertured lugs 57 in which a pin 58 is carried. The pin 58 receives a transverse sleeve 59 that is fixed, as by welding, to the lower end of a link 61, the upper end of which is threaded, as at 62. The end 62 of the link 61 carries upper and lower lock nuts 64 by which the end is adjustably connected to a trunnion 65 that is swingably carried at the rear end of a detent-controlling arm 66. The forward end of the arm 66 is pivoted, as at 67, to a clamping member 68 that is attachable by any suitable means, such as a bolt 69, to the rear portion of the upper compression or thrust link 13 forward of the connection of the latter with the attachment frame 24. As best shown in Figure 2, the arm 66 is made up of a pair of strap members 71 and 72 and these are preferably spaced apart, as by the trunnion 65, so that they are adapted to contact the pin 27 when the scoop is raised into a dumping position, as shown, for example, in Figure 4. Thus, when the tractor hitch linkage is raised, the angular movement of the upper link 13 relative to the attachment frame 24 acts through the arm 66 to raise the detent out of engagement with the abutments 51 and 52. As soon as the arm 66 engages the pin 27, the arm moves bodily with the thrust link 13 in the further raising of the unit. The detent 54 is shown in its raised position in Figure 4 and in this figure the bucket 40 is shown as dumped. In this position, the stop 49 engages the lower rear edges of the brackets 28 and 29 whereby further rearward movement of the lower or cutting edge of the bucket is limited. Therefore in this position the bucket may be used as a scraper or leveler for spreading the dumped load or loads. It will also be noted that the bucket stops 49 remain in engagement with the bracket 28 and 29 even though the draft linkage be lowered and the detent 54 returned toward its locking position. If when the linkage is lowered and the detent 54 returns to engagement with the upper portion of the bucket, the latter is in its leveling or spreading position, as shown in Figure 4, the bucket may be brought into digging position (Figure 1) merely by backing the tractor with the cutting edge of the bucket in contact with the ground. The abutment stops 51 and 52 are curved on their back side, as indicated at 51a, so that the bucket may be returned to its digging position and the detents 54 ride idly over the abutments 51 and 52, the detent dropping down by gravity into its locking position, as shown in Figure 1.

The bucket 40 may be easily and conveniently reversed in the attachment frame 24, merely by loosening and/or removing the pivot bolts 47, turning the bucket around so that the cutting edge 45 extends rearwardly, as shown in Figure 3, and then reinstalling and securing the pivot bolts 47. The abutment stops 51, 52 are mounted on the buckets 40 substantially directly above the pivot axis provided by the bolts 47 and associated structure. Therefore, when the detent 54 is reversed in the brackets 28 and 29, as by removing the upper bolts 31, which are slightly longer than the lower bolts 31, and installing them in a pair of rear openings 70, after first disconnecting the link 61, the latter may then be re-connected to the detent 54 in its new position (Figure 3) and the detent automatically operated as described above. If desired, or necessary, the upper bolts 31, when disposed in the openings 70, may be replaced by a pair of shorter bolts 31a in order to retain a secure connection between the brackets 28 and 29 and the attachment frame. If desired, of course, when the bucket 40 is reversed, as shown in Figure 3, the detent may be used in its first position, as shown in Figure 1, by appropriate proportioning of the parts. The lift lever stop S of the tractor may be set in this position if desired.

The transport position of the scoop attachment of the present invention is shown in dotted lines in Figure 1. As shown, the scoop bucket is raised to a point where the link 66 closely approaches or comes initially into contact with the pin 27 but before any appreciable lifting action has been imparted to the detent 54, so that the latter hold the bucket against dumping. Then, when it is desired to dump the load, the lever 16 is moved beyond the stop S, so as to raise the links 12 and 13 higher, as into the position shown in Figure 4, and this serves to raise the detent 54 and release the bucket.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A scoop adapted to be mounted on a tractor of the type having upper and lower hitch links, said scoop comprising a generally vertically disposed frame having means at its lower portions to receive the rear ends of the lower of said hitch links and means at its upper portion to receive the rear end of the upper of said hitch links, a scoop bucket pivotally connected with said frame for movement relative thereto about a generally transverse axis, a detent pivoted to said frame and disposed in a position to engage a portion of said bucket scoop for limiting movement thereof relative to said frame in at least one direction, a detent actuating arm, means connected with one end of the arm for pivotally connecting it with the upper link in a position extending rearwardly over the upper portion of said frame, means connecting the other end of said arm with said detent for operating the latter to release said scoop bucket, and means on said frame engageable with said arm for swinging the latter upwardly and disengaging said detent from the scoop when said frame is elevated beyond a certain point relative to said upper link.

2. A scoop adapted to be mounted on a tractor of the type having a pair of lower tension draft links and an upper compression link, and means on the tractor connected with said links for raising and lowering them, said scoop comprising a generally vertically disposed hitch frame adapted to pivotally receive the rear ends of said links, whereby swinging the latter vertically, as by said tractor-carried means, serves to raise and lower said hitch frame, a scoop bucket pivotally connected with the lower portion of said frame, stop means acting between said frame and said bucket for limiting the pivotal movement of the latter, comprising a member pivoted to said hitch frame above said scoop and extending rearwardly, an arm adapted to be pivoted to said upper link forward of said frame and extending rearwardly over and beyond the latter, and means connecting the rear end of said arm, rearwardly of said frame, with the stop member, said frame being engageable with the lower part of said arm, when the frame is raised, and acting thereby to raise said stop member to release the bucket when said hitch frame is raised.

3. The invention set forth in claim 2, further characterized by said stop member comprising a generally U-shaped bail member pivotally connected at its ends with said hitch frame and with the central portion of the bail member extending transversely across the upper portion of the scoop bucket, and a pair of abutments on the upper side of said bucket between the ends thereof and engageable with the transverse central portion of the U-shaped bail member.

4. A scoop attachment for tractors of the type including upper and lower, generally vertical swingable hitch links, said attachment comprising a generally vertical frame, a pair of generally vertically disposed, laterally spaced apart brackets carried by said frame, an earth-working scoop bucket, an arm adapted to be pivoted to the upper of said hitch links and extending over said frame to a point rearwardly thereof, a stop member pivotally connected with the forward portions of said brackets and extending generally rearwardly, a link connecting said arm and stop member, abutment means on said bucket engageable with said stop member, means reversibly mounting said bucket on said brackets, means on the rear portion of said brackets for receiving said stop member in a reversed position, and said link connecting said arm and stop member in either position of the latter.

5. An earth-working scoop adapted to be mounted on a tractor of the type having generally vertical swingable links, said scoop composing a generally vertically disposed hitch frame, a scoop bucket having a cutting edge and side portions, means for pivotally connecting said side portions with the lower portion of said hitch frame in either of two positions, one with the cutting edge extending forwardly and the other with the cutting edge extending rearwardly, a bucket-engaging detent, means for pivotally connecting said detent with said hitch frame at either of two points, one lying ahead of the vertical plane containing the axis of pivoting of said bucket, and the other rearwardly of said plane, a member adapted to be connected with one of said links and to be moved thereby relative to said hitch frame when the latter is elevated, and connection between said member and said detent in either position of the latter.

6. In a reversible scoop construction, a scoop supporting frame, a scoop bucket pivotally mounted in said frame and reversible from a forward facing position to a rearward facing position, stop means on said bucket, a detent adapted to be engaged by said stop means for limiting swinging of said bucket relative to said frame, pivot means connected with said detent, means for connecting said pivot means at two fore-and-aft spaced apart points on said frame for receiving said detent, whereby the latter may be reversed when said bucket is reversed in said frame, detent-operating means including an arm, and a link extending from the end of said arm to said detent, said arm being attached to the rear portion of said detent when the pivot means therefor is mounted in a forward position and with the forward portion of said detent when the pivot means therefor is mounted in a rear position.

7. A scoop adapted to be mounted on a tractor of the type having upper and lower hitch links, said scoop comprising a generally vertically disposed frame having means at its lower portion to receive the rear ends of the lower of said hitch links and means at its upper portion to receive the rear end of the upper of said hitch links, a scoop bucket pivotally connected with said frame for movement relative thereto about a generally transverse axis, a detent movably mounted on said frame and extending into a position to engage a portion of said bucket scoop for limiting movement thereof relative to said frame in at least one direction, a detent actuating arm, means connected with one end of the arm for pivotally connecting it with the upper link in a position extending rearwardly over the upper portion of said frame, means connecting the other end of said arm with said detent for operating the latter to release said scoop bucket, and means on said frame engageable with said arm between its ends when said frame is elevated beyond a certain point relative to said upper link for swinging the arm upwardly about its pivot connection with the upper link to cause the arm to disconnect said detent from the scoop.

References Cited in the file of this patent

UNITED STATES PATENTS

| | | |
|---|---|---|
| 2,107,895 | Lundstrom | Feb. 8, 1938 |
| 2,352,466 | Arps | June 27, 1944 |
| 2,548,461 | Arps | Apr. 10, 1951 |
| 2,622,349 | Kinnan | Dec. 23, 1952 |
| 2,641,854 | Nelson | June 16, 1953 |

FOREIGN PATENTS

| | | |
|---|---|---|
| 650,618 | Great Britain | Feb. 28, 1951 |